(12) United States Patent
Xu et al.

(10) Patent No.: US 10,572,712 B2
(45) Date of Patent: Feb. 25, 2020

(54) FINGERPRINT IDENTIFICATION APPARATUS

(71) Applicant: TPK ADVANCED SOLUTIONS INC., Xiamen (CN)

(72) Inventors: Liangzhen Xu, Xiamen (CN); Yu Zhang, Xiamen (CN); Hebo Yang, Xiamen (CN); Shuhui Lin, Xiamen (CN)

(73) Assignee: TPK ADVANCED SOLUTIONS INC., Xiamen (CN)

( * ) Notice: Subject to any disclaimer, the term of this patent is extended or adjusted under 35 U.S.C. 154(b) by 64 days.

(21) Appl. No.: 16/027,262

(22) Filed: Jul. 3, 2018

(65) Prior Publication Data
US 2019/0012519 A1 Jan. 10, 2019

(30) Foreign Application Priority Data
Jul. 7, 2017 (CN) .......................... 2017 1 0567893

(51) Int. Cl.
*G06K 9/00* (2006.01)

(52) U.S. Cl.
CPC ....... *G06K 9/00087* (2013.01); *G06K 9/0002* (2013.01); *G06K 9/0004* (2013.01); *G06K 9/00053* (2013.01)

(58) Field of Classification Search
CPC ............ G06K 9/00087; G06K 9/0002; G06K 9/0004; G06K 9/00053
See application file for complete search history.

(56) References Cited

U.S. PATENT DOCUMENTS

| | | | |
|---|---|---|---|
| 9,870,033 B1* | 1/2018 | Browning | H03K 17/975 |
| 2015/0363629 A1* | 12/2015 | Lee | G06K 9/0002 345/173 |
| 2016/0004899 A1* | 1/2016 | Pi | G06F 1/1626 345/173 |
| 2016/0077622 A1* | 3/2016 | Lee | G06F 1/1626 345/173 |
| 2018/0011601 A1* | 1/2018 | Kurasawa | G06F 3/0412 |
| 2018/0173931 A1* | 6/2018 | Hsu | G06K 9/00053 |
| 2018/0196991 A1* | 7/2018 | Choi | G06F 1/1684 |
| 2018/0225498 A1* | 8/2018 | Setlak | G06K 9/00026 |
| 2018/0373913 A1* | 12/2018 | Panchawagh | G06K 9/0002 |
| 2019/0147213 A1* | 5/2019 | Yeke Yazdandoost | G06K 9/00013 |

* cited by examiner

*Primary Examiner* — Utpal D Shah
(74) *Attorney, Agent, or Firm* — Cooper Legal Group, LLC (57) ABSTRACT

A fingerprint identification apparatus includes a cover lens, an optically clear adhesive layer, a fingerprint sensitive layer and a stress buffer. A total thickness of the cover lens and the optically clear adhesive layer is less or equal to a value "M", wherein 0.3 mm≤M≤0.45 mm. The cover lens and the fingerprint sensitive layer are adhered by the optically clear adhesive layer. The fingerprint sensitive layer is disposed on the stress buffer. The stress buffer has greater hardness than that of the fingerprint sensitive layer.

12 Claims, 5 Drawing Sheets

FINGERPRINT IDENTIFICATION APPARATUS

RELATED APPLICATIONS

This application claims priority to China Application Serial Number 201710567893.1, filed Jul. 7, 2017, which is herein incorporated by reference.

BACKGROUND

Technical Field

The present disclosure relates to a fingerprint identification apparatus.

Description of Related Art

A touch panel is a popular input device in a handheld mobile device. In order to improve data confidentiality, one or more authentication mechanisms are employed in the mobile device to verify a user's identity. A typical authentication mechanism involves requesting the user to input a password. If the input password is verified, the handheld mobile device is unlocked. However, it is inconvenient for the user to input a character sequence using the touch panel. Therefore, biometric features, such as fingerprints, facial images, irises and so on, have been used in particular mobile devices for identity verification.

Taking fingerprint identification as an example, the handheld mobile device may include a fingerprint identification area. Numerous electrodes are distributed in the fingerprint identification area to detect fingerprints in a capacitive manner. The fingerprint identification area is generally disposed in a non-viewable area. However, as the demand for narrower frame of the mobile device has grown recently, there has grown a need for smaller non-viewable area.

SUMMARY

Embodiments of the present disclosure provide a finger identification apparatus that either has high endurance to an impact force or allows fingerprint sensitive electrodes formed on the view area without adversely affecting the fingerprint identification ability.

In some embodiments, a fingerprint identification apparatus includes a cover lens, an optically clear adhesive layer, a fingerprint sensitive layer and a stress buffer. A total thickness of the cover lens and the optically clear adhesive layer is less than or equal to a value M, and 0.3 mm≤M≤0.45 mm. The cover lens and the fingerprint sensitive layer are adhered by the optically clear adhesive layer. The fingerprint sensitive layer is disposed on the stress buffer. The stress buffer has greater hardness than that of the fingerprint sensitive layer.

In the foregoing embodiments, the fingerprint identification apparatus includes the stress buffer that is beneficial in buffering external impacts exerted on the fingerprint identification apparatus. For example, when a ball drop test is carried out on the fingerprint identification apparatus, the stress buffer can buffer an impact force from a dropped ball. Therefore, the stress buffer improves the endurance to the impact force for the fingerprint identification apparatus. Moreover, because the endurance to the impact force has been improved, a thickness requirement of the cover lens above the fingerprint sensitive layer is relaxed. As a result, a thinner cover lens can be used in the fingerprint identification apparatus so as to prevent the fingerprint verification ability from adversely affected by a thick cover lens. In this manner, the finger identification apparatus either has high endurance to an impact force or allows fingerprint sensitive electrodes formed on the view area without adversely affecting the fingerprint identification ability.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
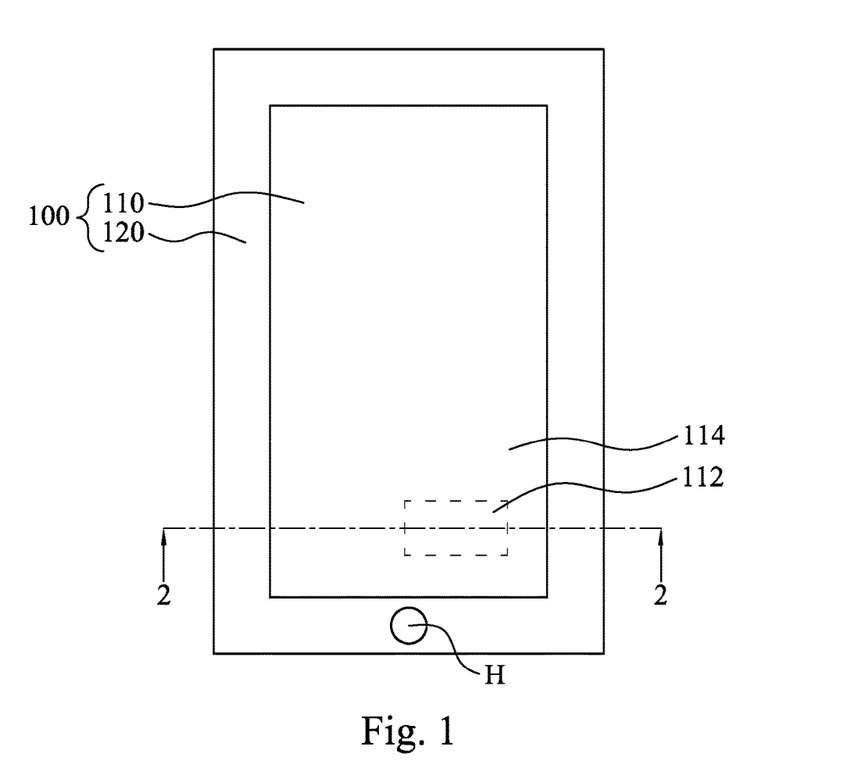
FIG. 1 is a top view of a fingerprint identification apparatus in accordance with some embodiments of the present disclosure.
Figure 2:
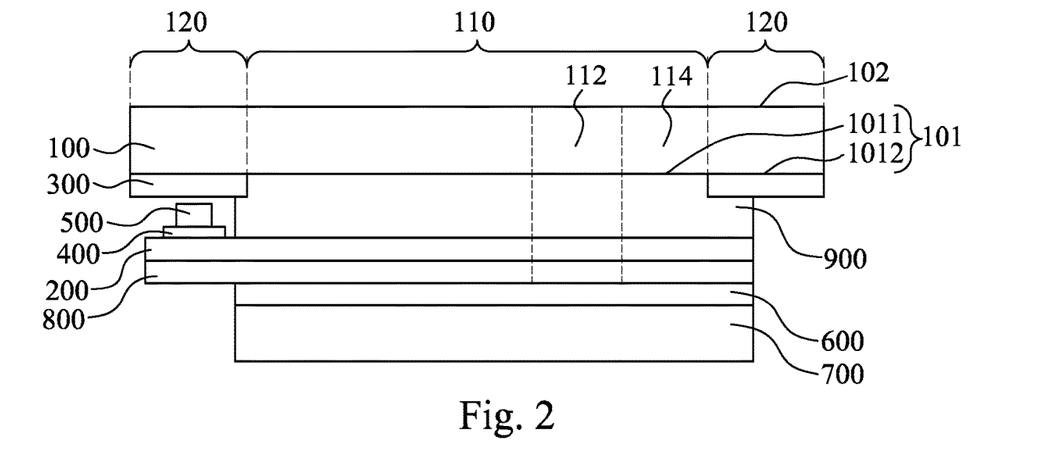
FIG. 2 is a cross-sectional view of a fingerprint identification apparatus taken along line 2-2 in FIG. 1.

FIG. 1 is a top view of a fingerprint identification apparatus in accordance with some embodiments of the present disclosure. FIG. 2 is a cross-sectional view of the fingerprint identification apparatus taken along line 2-2 in FIG. 1. As shown in FIG. 1 and FIG. 2, the fingerprint identification apparatus includes a cover lens 100, a fingerprint sensitive layer 200, an opaque layer 300, an electrically conductive adhesive 400, a fingerprint identification chip 500, a stress buffer 800 and an optically clear adhesive layer 900. The cover lens 100 has an inner surface 101 and an outer surface 102 opposite to each other. The outer surface 102 can serve as a user's interface for touch control. In some embodiments, functional layers, such as an anti-dust layer, an anti-fingerprint layer, an anti-scratch layer, an anti-glare layer, or combinations thereof, can be disposed on the outer surface 102. In some embodiments, the cover lens 100 can include a light permeable material such as a glass, as an example. The outer surface 102 and the inner surface 101 can be strengthened chemically or physically, so as to improve protection for the underlying opaque layer 300 and the fingerprint sensitive layer 200. The inner surface 101 has adjacent first and second portions 1011 and 1012. In some embodiments, the second portion 1012 is an edge region of the inner surface 101 near a side of the cover lens 100. The first portion 1011 is a central region of the inner surface 101, and the second portion 1012 may surround the first portion 1011.

The opaque layer 300 covers the second portion 1012 of the inner surface 101 of the cover lens 100 and exposes the first portion 1011. Therefore, devices below the second portion 1012 of the inner surface 101 may be shielded by the opaque layer 300, and other devices below the first portion 1011 of the inner surface 101 are not shielded by the opaque layer 300. Therefore, the cover lens 100 has a viewable area 110 exposed by the opaque layer 300 and a non-viewable area 120 covered by the opaque layer 300. In some embodiments, the opaque layer 300 includes an opaque material such as an opaque photoresist material or an ink, as examples. The viewable area 110 includes a fingerprint identification area 112 and a non-fingerprint identification area 114 adjacent to the fingerprint identification area 112. In some embodiments, the non-fingerprint identification area 114 surrounds the fingerprint identification area 112.

The fingerprint sensitive layer 200 at least vertically overlaps the viewable area 110 of the cover lens 100. A portion of the fingerprint sensitive layer 200 within (or vertically below) the fingerprint identification area 112 is sensitive to fingerprints. The fingerprint sensitive layer 200 and the inner surface 101 of the cover lens 100 are adhered by the optically clear adhesive layer 900. The fingerprint sensitive layer 200 is disposed on the stress buffer 800. In other words, the fingerprint sensitive layer 200 is disposed between the optically clear adhesive layer 900 and the stress buffer 800. The fingerprint identification chip 500 is adhered to the fingerprint sensitive layer 200 by the electrically conductive adhesive 400 (e.g., an anisotropic conductive film; ACF), so that the fingerprint identification chip 500 can be electrically connected to the fingerprint sensitive layer 200. In this manner, the fingerprint identification chip 500 can verify the user's fingerprint via capacitive variation from fingerprint sensitive electrodes in the fingerprint sensitive layer 200. In some embodiments, the fingerprint identification chip 500 and the electrically conductive adhesive 400 are located below the opaque layer 300, so that these opaque devices can be shielded by the opaque layer 300.

Figure 3:
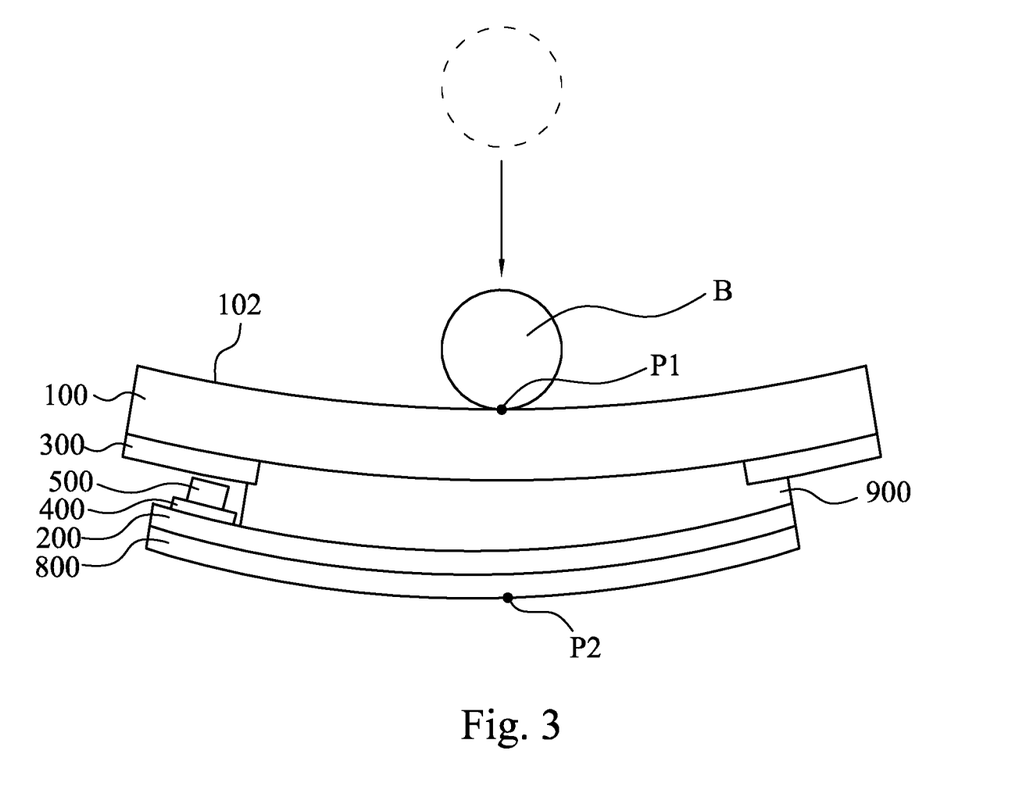
FIG. 3 is a schematic view of a fingerprint identification apparatus without a touch display apparatus in a ball drop test.
Figure 4:
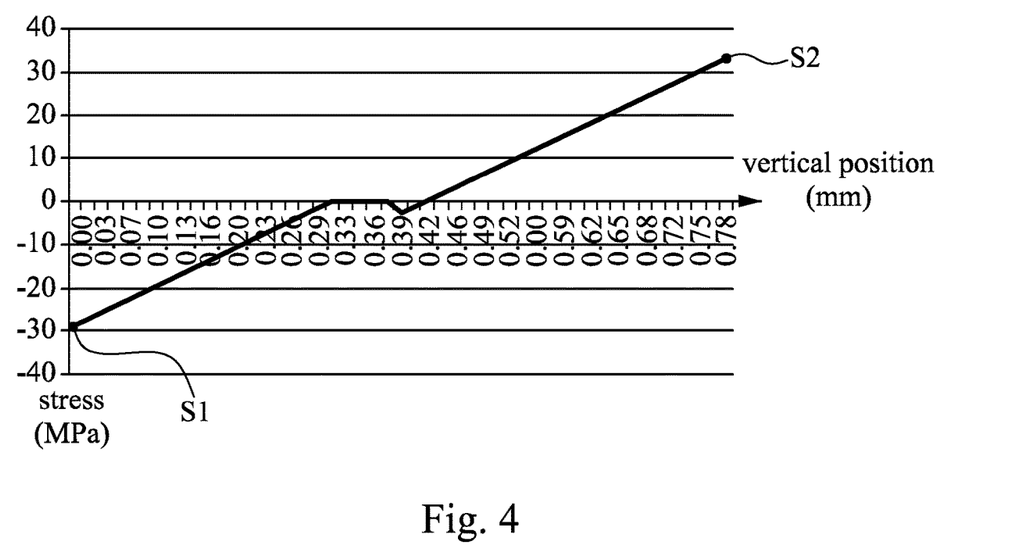
FIG. 4 is a diagram of stress on various vertical positions of a fingerprint identification apparatus.

In some embodiments, the stress buffer 800 has hardness greater than that of the fingerprint sensitive layer 200, so as to buffer the impact force exerted on the fingerprint identification apparatus. As a result, resistance to the impact force can be improved. For example, reference can be now made to FIG. 3, which is a schematic view of the fingerprint identification apparatus in FIG. 1 in a ball drop test before assembly to the touch display apparatus 700. As shown in FIG. 3, a diagram of stresses on various vertical positions of the fingerprint identification apparatus when a dropped ball B hits the outer surface 102 of the cover lens 100 is shown in FIG. 4. The fingerprint identification apparatus has a topmost perpendicular position P1 and a bottommost perpendicular position P2. The topmost perpendicular position P1 is subjected to a stress value S1 as shown in FIG. 4, and the bottommost perpendicular position P2 is subjected to a stress value S2 as shown in FIG. 4. As shown in FIG. 4, in the ball drop test, a maximal stress exerted on the fingerprint identification apparatus is the stress value S2, which is about 35 MPa.

Figure 5:
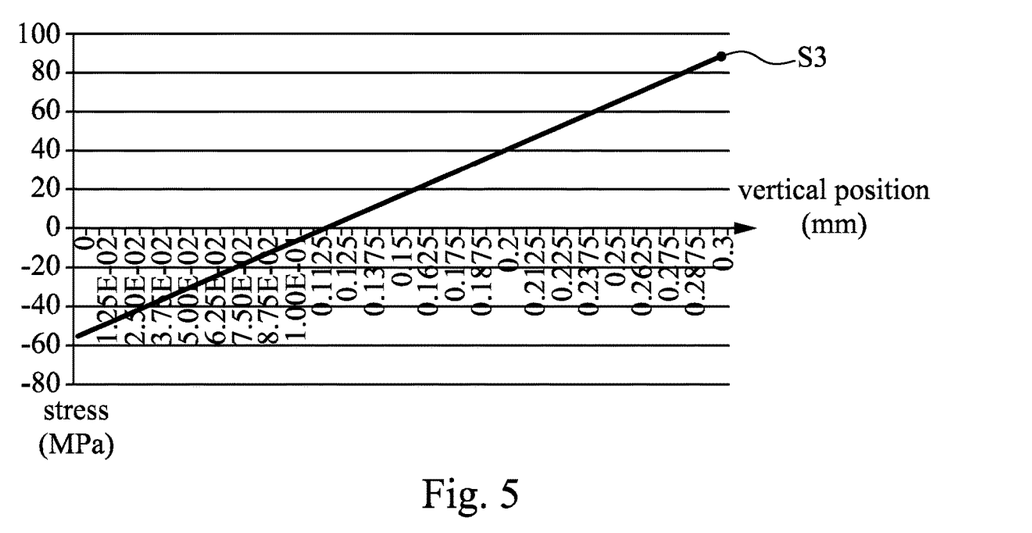
FIG. 5 is a diagram of stress on various vertical positions of a fingerprint identification apparatus without a stress buffer in a ball drop test.

FIG. 5 is a diagram of stress on various vertical positions of a fingerprint identification apparatus without the stress buffer 800, wherein the fingerprint identification apparatus experiences the same test condition of the ball drop test carried out as described with respect to FIG. 3. As shown in FIG. 5, in the drop ball test, the fingerprint identification apparatus is subjected to a maximal stress value S3. The maximal stress value S3 is about 80 MPa, which is considerably greater than the stress value S2 (35 MPa) shown in FIG. 4. As shown in FIGS. 4 and 5, when the fingerprint identification apparatus includes the stress buffer 800, the stress buffer 800 can effectively buffer or otherwise reduce the stress exerted on the fingerprint identification apparatus. Therefore, when the fingerprint identification apparatus undergoes an impact, the fingerprint identification apparatus experiences a lower maximal stress level. As a result of the stress buffer 800, the fingerprint identification apparatus has improved resistance to impact force.

Because the fingerprint identification apparatus has the improved endurance benefited from the stress buffer 800, a thickness requirement of the cover lens 100 is relaxed. That is to say, in some embodiments, the fingerprint identification apparatus does not require a thick cover lens 100 to improve the endurance to the impact force. Therefore, a thin cover lens 100 can be involved in the fingerprint identification apparatus. The thin cover lens 100 can prevent the cover lens 100 and the optically clear adhesive layer 900 from forming a stack that is too thick to satisfy accuracy of fingerprint verification. For example, a total thickness of the cover lens 100 and the optically clear adhesive layer 900 can be less than or equal to a value M, where $0.3\ \text{mm} \leq M \leq 0.45\ \text{mm}$. When the total thickness of the cover lens 100 and the optically clear adhesive layer 900 satisfies the foregoing range, the fingerprint identification chip 500 can perform accurate fingerprint identification.

In some embodiments, the stress buffer 800 has a thickness greater than the total thickness of the cover lens 100 and the optically clear adhesive layer 900, and hence the stress buffer 800 can effectively buffer the stress exerted on the fingerprint identification apparatus. In some embodiments, a total thickness of the stress buffer 800 and the fingerprint sensitive layer 200 is greater than 0.28 mm. For example, the total thickness of the stress buffer 800 and the fingerprint sensitive layer 200 can be greater than 0.28 mm and less than 0.4 mm. In some embodiments, the stress buffer 800 includes inflexible light permeable materials such as glass or the like. For example, the stress buffer 800 can be a glass plate. A total thickness of the glass plate and the fingerprint sensitive layer 200 is greater than or equal to 0.28 mm, so as to buffer the stress exerted on the fingerprint identification apparatus.

In some embodiments where the stress buffer 800 is the inflexible glass plate, the stress buffer 800 below the fingerprint identification chip 500 cannot be bent downwardly to provide an enlarged space for the fingerprint identification chip 500. Therefore, in such embodiments, the optically clear adhesive layer 900 has a thickness greater than a total thickness of the opaque layer 300, the electrically conductive adhesive 400 and the fingerprint identification chip 500, so that the fingerprint identification chip 500 can be disposed between the cover lens 100 and the stress buffer 800 without interfering with the opaque layer 300.

Figure 6:
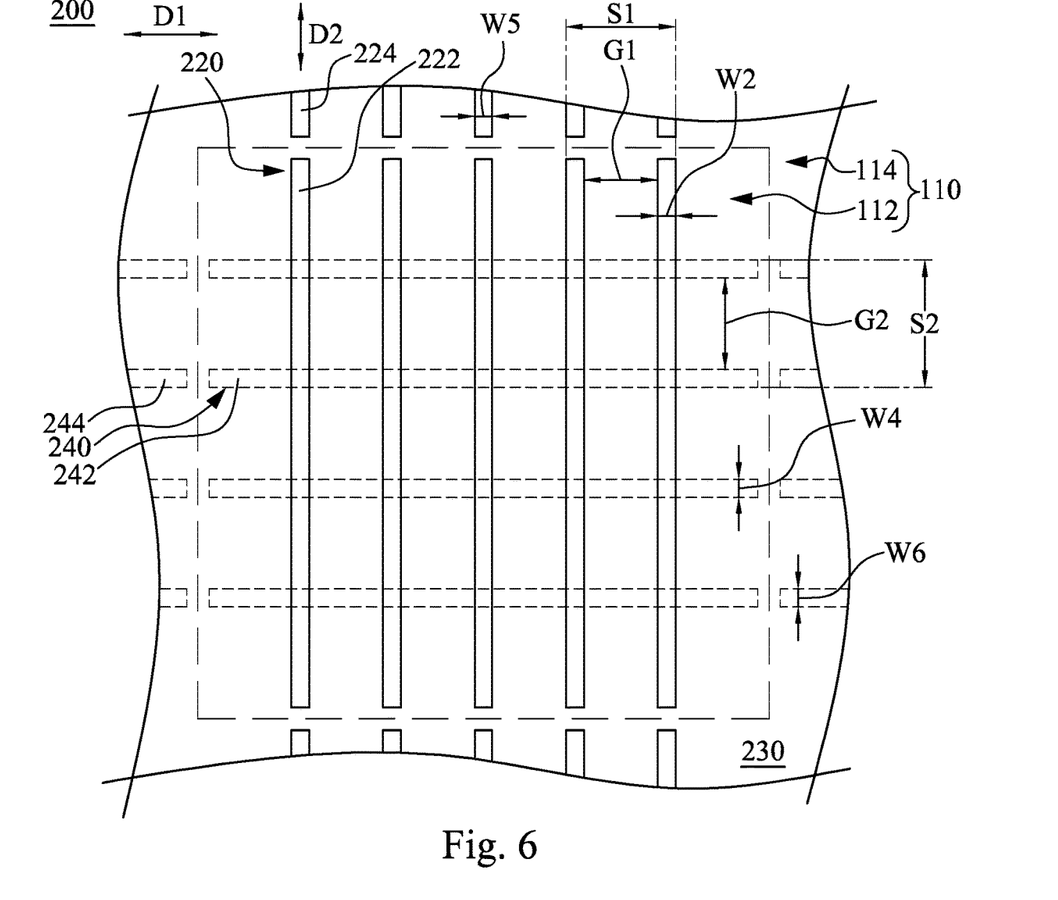
FIG. 6 is a top view of a fingerprint sensitive layer in accordance with some embodiments of the present disclosure.
Figure 7:
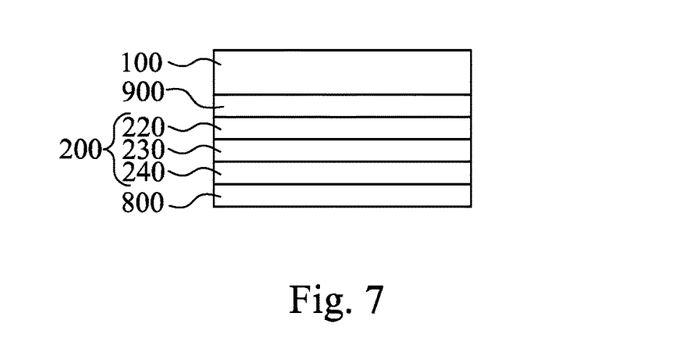
FIG. 7 is a schematic view of a stack of a fingerprint sensitive layer and a cover lens in accordance with some embodiments of the present disclosure.

FIG. 6 is a top view of the fingerprint sensitive layer 200. FIG. 7 is a schematic view of a stack of the fingerprint sensitive layer 200 and the cover lens 100. As shown in FIG. 6 and FIG. 7, the fingerprint sensitive layer 200 includes a first electrode layer 220, an insulation layer 230 and a second electrode layer 240 arranged in sequence below the cover lens 100. In other words, the insulation layer 230 is located between the first electrode layer 220 and the second electrode layer 240 so as to separate the first electrode layer 220 and the second electrode layer 240. Therefore, the first electrode layer 220 is electrically insulated from the second electrode layer 240. The first electrode layer 220 includes a plurality of first fingerprint sensitive electrodes 222. The second electrode layer 240 is disposed on the stress buffer 800 and includes a plurality of second fingerprint sensitive electrodes 242. The first fingerprint sensitive electrodes 222 and the second fingerprint sensitive electrodes 242 are disposed vertically below the viewable area 110 in a crossing manner. In other words, projections of the first and second fingerprint sensitive electrodes 222 and 242 on the viewable area 110 intersect with each other. The insulation layer 230 can separate the first fingerprint sensitive electrodes 222 from the second fingerprint sensitive electrodes 242, so that the first fingerprint sensitive electrodes 222 are electrically insulated from the second fingerprint sensitive electrodes 242. In some embodiments, the first fingerprint sensitive electrodes 222 can serve as Tx electrodes, and the second fingerprint sensitive electrodes 242 can serve as Rx electrodes, and a capacitance can be formed therebetween. When the outer surface 102 of the cover lens 100 (as shown in FIG. 2) is touched by a finger tip of a user, the capacitances of corresponding fingerprint sensitive electrodes vary in response to the touch, so that ridges and troughs on the fingerprint of the user can be detected. In some other embodiments, the first fingerprint sensitive electrodes 222 can serve as Rx electrodes, and the second fingerprint sensitive electrodes 242 can serve as Tx electrodes.

In some embodiments, one first fingerprint sensitive electrode 222 and one neighboring first fingerprint sensitive electrode 222 are separated by a distance G1. One second fingerprint sensitive electrode 242 and one neighboring second fingerprint sensitive electrode 242 are separated by a distance G2. The distances G1 and G2 correspond to a nominal pitch of troughs of an adult's fingerprint. For example, the pitch is about 75 μm, and the distance G1 between the neighbor first fingerprint sensitive electrodes 222 can be less than 75 μm (e.g., in a range from about 50 μm to about 70 μm). The distance G2 between the neighboring second fingerprint sensitive electrodes 242 can be less than 75 μm (e.g., in a range from about 50 μm to about 70 μm) as well. Such distances are beneficial in detecting the ridges and troughs of a fingerprint of the user, so that the first and second fingerprint sensitive electrodes 222 and 242 can achieve fingerprint recognition or identification.

In some embodiments, the first fingerprint sensitive electrodes 222 are formed of a material with a low sheet resistance, and hence the first fingerprint sensitive electrodes 222 have an improved conductivity for benefiting fingerprint identification. A light permeability of the material with the low sheet resistance may be insufficient to visually ignore the electrodes, so that the first fingerprint sensitive electrodes 222 under the viewable area 110 may be perceived by the user. Therefore, in order to reduce visual perceptibility of the first fingerprint sensitive electrodes 222, the first fingerprint sensitive electrodes 222 with narrow widths are desirable.

In some embodiments, the first fingerprint sensitive electrodes 222 include metal and therefore are referred to as first metal electrodes. For example, the first fingerprint sensitive electrodes 222 can include, but are not limited to, molybdenum-aluminum-molybdenum alloy, copper, silver, titanium, niobium, rubidium, or combinations thereof.

In some embodiments, the first fingerprint sensitive electrodes 222 are arranged along a first direction D1 in a spaced-apart manner. That is to say, the distance G1 between the two neighboring first fingerprint sensitive electrodes 222 is measured along the first direction D1.

In some embodiments, the second fingerprint sensitive electrodes 242 are arranged along a second direction D2 in a spaced-apart manner. The first direction D1 and the second direction D2 intersect with each other. In some embodiments, the first direction D1 is substantially perpendicular to the second direction D2. The distance G2 between the two neighboring second fingerprint sensitive electrodes 242 is measured along the second direction D2.

In some embodiments, the first fingerprint sensitive electrode 222 has a width W2 in a first direction D1, and the width W2 ranges from about 1 μm to about 20 μm. The width W2 is particularly in a range of about 2 μm to about 12 μm, and more particularly in a range of about 2 μm to about 8 μm. In some embodiments, the second fingerprint sensitive electrode 242 has a width W4 in the second direction D2 ranging from about 1 μm to about 20 μm. Specifically, the width W2 ranges from about 2 μm to about 12 μm and more specifically from about 2 μm to about 8 μm. In some embodiments, outermost sides of two neighboring first fingerprint sensitive electrodes 222 are separated by a distance S1 in a range from about 50 μm to about 80 μm. Outermost sides of two neighboring second fingerprint sensitive electrodes 242 are separated by a distance S2 in a range from about 50 μm to about 80 μm as well. Such dimensions can improve resolution of the fingerprint sensitive layer 200, so that accurate fingerprint identification can be achieved.

In some embodiments, the first electrode layer 220 has a thickness ranging from about 0.01 μm to about 2 μm. Specifically, the thickness of the first electrode layer 220 is in a range from about 0.1 μm to about 1 μm. In some embodiments, the thickness of the insulation layer 230 ranges from about 1 μm to about 10 μm. In particular, the thickness of the insulation layer 230 is in a range from about 3 μm to about 10 μm. In some embodiments, the second electrode layer 240 has a thickness ranging from about 0.01 μm to about 2 μm. In detail, the thickness range of the second electrode layer 240 is in a range from about 0.1 μm to about 1 μm. In some embodiments, the cover lens 100 has a thickness ranging from about 0.01 mm to about 2 mm and specifically from about 0.01 mm to about 0.55 mm. These dimensions are beneficial in keeping distances from the first and second fingerprint sensitive electrodes 222 and 242 to the outer surface 102 of the cover lens 100 in an acceptable range to benefit fingerprint identification.

In some embodiments, the first electrode layer 220 is closer to the cover lens 100 than the second electrode layer 240 is. In other words, the first fingerprint sensitive electrodes 222 are closer to the cover lens 100 than the second fingerprint sensitive electrode 242 is. Therefore, compared to the second fingerprint sensitive electrodes 242, the first fingerprint sensitive electrodes 222 are more visually perceptible. Therefore, in some embodiments, the first fingerprint sensitive electrodes 222 can have anti-reflection features, matted surfaces or dark surfaces so as to reduce the visual perceptibility of the first fingerprint sensitive electrode 222. For example, the first fingerprint sensitive electrode 222 includes molybdenum oxide ($MoO_x$). For example, the first fingerprint sensitive electrode 222 may comprise a stack of a molybdenum oxide layer, an aluminum layer and a molybdenum layer. The molybdenum oxide layer is closer to the cover lens 100 than the aluminum layer and the molybdenum layer are. The molybdenum oxide layer, which is formed by an oxidation process, provides low reflectance for the first fingerprint sensitive electrode 222 and therefore results in a reduced visual perceptibility of the first fingerprint sensitive electrode 222.

In accordance with exemplary embodiments, an intervening space between the second fingerprint sensitive electrode 242 and the cover lens 100 is greater than that between the first fingerprint sensitive electrode 222 and the cover lens 100, so that the second fingerprint sensitive electrodes 242 are less visual perceptible. Therefore, the second fingerprint sensitive electrode 242 may not include anti-reflection features, matted surfaces or dark surfaces. That is to say, the second fingerprint sensitive electrode 242 can be free from molybdenum oxide. Accordingly, in some embodiments where the first fingerprint sensitive electrodes 222 include molybdenum oxide, the first fingerprint sensitive electrodes 222 can comprise materials different from the second fingerprint sensitive electrodes 242.

In some embodiments, the first electrode layer 220 can further comprise a plurality of first dummy electrodes 224 arranged under a non-fingerprint identification area 114 in a spaced-apart manner. The first dummy electrodes 224 are aligned with and electrically insulated from the first fingerprint sensitive electrodes 222. The first dummy electrodes 224 and the first fingerprint sensitive electrodes 222 comprise the same material. That is to say, the first dummy electrodes 224 and the first fingerprint sensitive electrodes 222 are formed in substantially identical arrangement and comprise same material. A difference in appearance (e.g., color difference) between the fingerprint identification area 112 and the non-fingerprint identification area 114 is thus reduced.

In some embodiments, the first dummy electrodes 224 are arranged along the first direction D1 in a spaced-apart manner. A distance between two neighboring first dummy electrodes 224 is substantially equal to the distance G1 between two neighboring first fingerprint sensitive electrodes 222, so that the arrangement of first dummy electrodes 224 and arrangement of the first fingerprint sensitive electrodes 222 are the same. In some embodiments, the first dummy electrode 224 has a width W5 in the first direction D1, and the width W5 is substantially equal to the width W2 of the first fingerprint sensitive electrode 222 in the first direction D1, so that the difference in appearance between the first dummy electrodes 224 and the first fingerprint sensitive electrodes 222 is reduced. One first fingerprint sensitive electrode 222 and a corresponding first dummy electrode 224 are arranged along the second direction D2 in a spaced-apart manner. In other words, the first fingerprint sensitive electrode 222 and the first dummy electrode 224 are aligned in the second direction D2 and spaced apart from each other. In some embodiments, when the fingerprint identification area 112 is surrounded by the non-fingerprint identification area 114, one first fingerprint sensitive electrode 222 is located between the two first dummy electrodes 224 and electrically insulated from the two first dummy electrodes 224. For example, one first dummy electrode 224, one first fingerprint sensitive electrode 222 and another first dummy electrode 224 are arranged along the second direction D2 in a spaced-apart manner, such that the first fingerprint sensitive electrode 222 is electrically insulated from the two first dummy electrodes 224. In this manner, the fingerprint identification area 112 and the surrounding non-fingerprint identification area 114 have a reduced appearance difference.

In some embodiments, the first dummy electrodes 224 are located in the first electrode layer 220, and the first electrode layer 220 is located closer to the cover lens 100 than the second electrode layer 240 is, so that the first dummy electrodes 224 are closer to the cover lens 100 than the second fingerprint sensitive electrodes 242 is. Therefore, the first dummy electrodes 224 are more visually perceptible. Therefore, the first dummy electrodes 224 can have anti-reflection features, matted surfaces or dark surfaces, so as to reduce the visual perceptibility of the first dummy electrodes 224. For instance, the first dummy electrodes 224 include molybdenum oxide. In some embodiments, the first dummy electrode 224 is a stack of a molybdenum layer, an aluminum layer, and a molybdenum oxide layer. The molybdenum oxide layer is closer to the cover lens 100 than the molybdenum layer and aluminum layer are. The molybdenum oxide formed by an oxidation process can reduce the reflectance of the first dummy electrodes 224, so that the visual perceptibility of the first dummy electrodes 224 can be reduced. In some embodiments, the first fingerprint sensitive electrodes 222 and the first dummy electrodes 224 include molybdenum oxide, so that an appearance difference therebetween is reduced.

In some embodiments, the second electrode layer 240 further comprises a plurality of second dummy electrodes 244 arranged in a spaced-apart manner under the non-fingerprint identification area 114. The second dummy electrodes 244 are aligned with and electrically insulated from the second fingerprint sensitive electrodes 242. The second dummy electrodes 244 comprise the same material as the second fingerprint sensitive electrodes 242 do. In other words, the second dummy electrodes 244 and the second fingerprint sensitive electrodes 242 have the same arrangement and material. An appearance difference (e.g., color difference) between the fingerprint identification area 112 and the non-fingerprint identification area 114 can be thus reduced.

In some embodiments, the second dummy electrodes 244 are arranged along the second direction D2 in a spaced-apart manner. A distance between two neighboring second dummy electrodes 244 is substantially equal to the distance G2 between two neighboring fingerprint sensitive electrodes 242. Therefore, arrangement of the second dummy electrodes 244 and arrangement of the second fingerprint sensitive electrodes 242 are the same. In some embodiments, the second dummy electrode 244 has a width W6 in the second direction D2, and the width W6 is substantially equal to the width W4 of the second fingerprint sensitive electrode 242 in the second direction D2. Therefore, a difference in appearance between the second dummy electrodes 244 and the second fingerprint sensitive electrodes 242 is reduced. One second fingerprint sensitive electrode 242 and a corresponding second dummy electrode 244 are arranged along the first direction D1 in a spaced-apart manner. That is to say, the second fingerprint sensitive electrode 242 and the second dummy electrode 244 are aligned in the first direction D1 and separated from each other. In some embodiments, when the fingerprint identification area 112 is surrounded by the non-fingerprint identification area 114, one second fingerprint sensitive electrode 242 is located between two second dummy electrodes 244 and is electrically insulated from the two second dummy electrodes 244. For instance, one second dummy electrode 244, one second fingerprint sensitive electrode 242 and another second dummy electrode 244 are arranged along the first direction D1 in a spaced-apart manner, such that the second fingerprint sensitive electrode 242 is electrically insulated from the two second dummy electrodes 244. By such configuration, the appearance difference between the fingerprint identification area 112 and the surrounding non-fingerprint identification area 114 is reduced.

In some embodiments, because the second dummy electrodes 244 are located farther away from the cover lens 100 than the first dummy electrodes 224 being, the second dummy electrodes 244 are less visually perceivable. Therefore, the second dummy electrodes 244 can be free from anti-reflection features, matted surfaces and dark surfaces. That is to say, the second dummy electrodes 244 may not include molybdenum oxide. Therefore, in some embodiments where the first dummy electrodes 224 include molybdenum oxide, the first dummy electrodes 224 may include materials different from the second dummy electrodes 244. In some embodiments where the first fingerprint sensitive electrodes 222 include molybdenum oxide, the first fingerprint sensitive electrodes 222 and the second dummy electrodes 244 may include different materials.

In some embodiments of the present disclosure, the insulation layer 230 extends continuously below the viewable area 110. In other words, the first fingerprint sensitive electrodes 222 and the second fingerprint sensitive electrodes 242 are spaced apart by a continuous insulation layer, rather than by several individual insulation pieces. Such a continuous configuration can reduce visual perceptibility of the insulation layer 230.

In some embodiments, as shown in FIG. 2, the fingerprint identification apparatus further includes an optically clear adhesive layer 600 and a touch display apparatus 700. The touch display apparatus 700 is adhered to the stress buffer 800 by the optically clear adhesive layer 600. In particular, the stress buffer 800 is located between the fingerprint sensitive layer 200 and the touch display apparatus 700. The touch display apparatus 700 can be, but is not limited to, an in-cell or on-cell touch panel. That is to say, the touch display apparatus 700 includes a display panel and a touch panel (not shown) therein. Therefore, the fingerprint sensitive layer 200 above the touch display apparatus 700 may not act as a touch panel.

In some embodiments, with reference to FIG. 1, the non-viewable area 120 has a button pattern H. A minimum distance between the fingerprint identification area 112 and the button pattern H is less than 5 mm. Specifically, the first and second fingerprint sensitive electrodes 222 and 242 (as shown in FIG. 6) under the fingerprint identification area 112 are separated from the button pattern H by a minimum distance less than 5 mm. Because the fingerprint identification chip 500 is located under the non-viewable area 120, the foregoing minimum distance is beneficial in reducing distances from the first and second fingerprint sensitive electrodes 222 and 242 to the fingerprint identification chip 500. Therefore, signal loss during transmitting from the first and second fingerprint sensitive electrodes 222 and 242 to the fingerprint identification chip 500 is reduced. In some embodiments, the button pattern H can be an opening in the non-viewable area 120 so that a button can be exposed (e.g., a Home key). In some other embodiments, the button pattern H can be an ink pattern in the non-viewable area 120. The ink pattern can cover the button (e.g., a Home key), and the ink pattern has a different color from other areas of the non-viewable area 120, so that the user can identify a position of the button.

Figure 8:
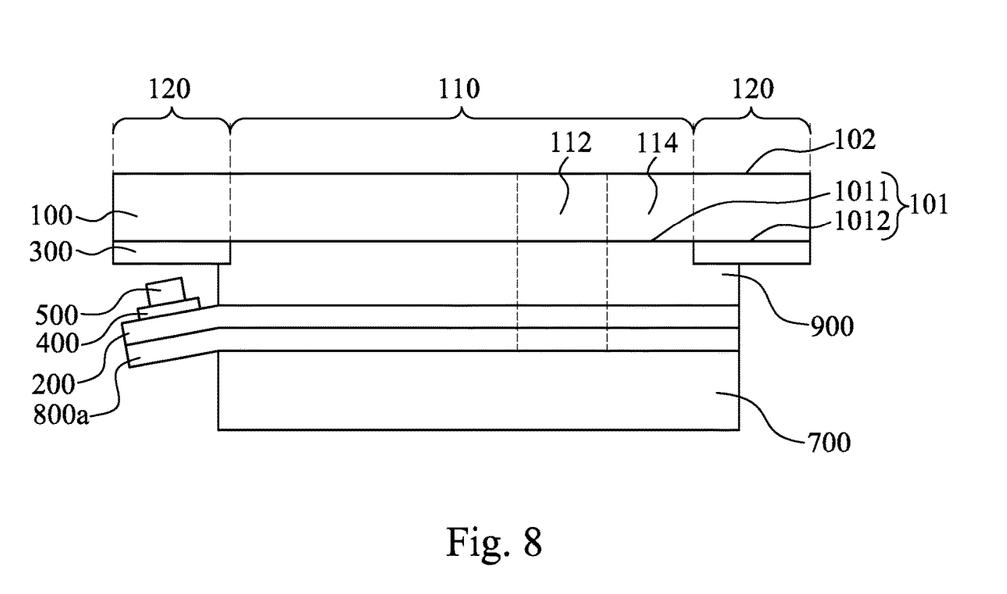
FIG. 8 is a cross-sectional view of a fingerprint identification apparatus in accordance with some embodiments of the present disclosure.

FIG. 8 is a cross-sectional view of a fingerprint identification apparatus in accordance with some embodiments of the present disclosure. As shown in FIG. 8, a main difference between the present embodiments and the embodiments in FIG. 1 is that: a stress buffer 800a in accordance with the present embodiments is a flexible film, so that the stress buffer 800a can be downwardly bent to provide an enlarged space for the fingerprint identification chip 500. Therefore, in such embodiments, a thickness of the optically clear adhesive layer 900 may be not greater than the total thickness of the opaque layer 300, the electrically conductive adhesive 400 and the fingerprint identification chip 500.

In various embodiments, the stress buffer 800a has pencil hardness of 9 H or more, so as to provide enough stress buffering ability. In other words, the stress buffer 800a can be a flexible film with pencil hardness of 9 H or more. In some embodiments, a total thickness of the flexible film with the pencil hardness of 9 H or more and the fingerprint sensitive layer 200 ranges from about 0.15 mm to about 0.2 mm. In such embodiments, a thickness of the flexible film with the pencil hardness of 9 H or more can be less than a total thickness of the cover lens 100 and the optically clear adhesive layer 900.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fingerprint identification apparatus, comprising:
   a cover lens;
   an optically clear adhesive layer, wherein a total thickness of the cover lens and the optically clear adhesive layer is less than or equal to a value M, wherein $0.3 \text{ mm} \leq M \leq 0.45 \text{ mm}$;
   a fingerprint sensitive layer, wherein the cover lens and the fingerprint sensitive layer are adhered by the optically clear adhesive layer; and
   a stress buffer, wherein the fingerprint sensitive layer is disposed on the stress buffer, and wherein the stress buffer has greater hardness than that of the fingerprint sensitive layer.

2. The fingerprint identification apparatus of claim 1, wherein a total thickness of the stress buffer and the fingerprint sensitive layer is greater than or equal to 0.28 mm.

3. The fingerprint identification apparatus of claim 1, wherein the stress buffer comprises a glass.

4. The fingerprint identification apparatus of claim 1, wherein the stress buffer is a glass plate, and a total thickness of the glass plate and the fingerprint sensitive layer is greater than or equal to 0.28 mm.

5. The fingerprint identification apparatus of claim 1, wherein the stress buffer has a thickness greater than the total thickness of the cover lens and the optically clear adhesive layer.

6. The fingerprint identification apparatus of claim 1, wherein the stress buffer is a flexible film.

7. The fingerprint identification apparatus of claim 1, wherein the stress buffer has pencil hardness of 9 H or more.

8. The fingerprint identification apparatus of claim 1, wherein the stress buffer is a flexible film having pencil hardness of 9 H or more.

9. The fingerprint identification apparatus of claim 8, wherein the flexible film having the pencil hardness of 9 H or more has a thickness less than the total thickness of the cover lens and the optically clear adhesive layer.

10. The fingerprint identification apparatus of claim 8, wherein the flexible film having the pencil hardness of 9 H or more and the fingerprint sensitive layer have a total thickness in a range from about 0.15 mm to about 0.2 mm.

11. The fingerprint identification apparatus of claim 1, wherein the cover lens has a viewable area, and the fingerprint sensitive layer at least partially overlaps the viewable area.

12. The fingerprint identification apparatus of claim 1, further comprising:
a touch display apparatus adhered to the stress buffer.

* * * * *